United States Patent
Kaushal

(10) Patent No.: US 7,135,694 B2
(45) Date of Patent: Nov. 14, 2006

(54) HUMAN BODY STANDARD CALIBRATION APPARATUS AND METHOD FOR CALIBRATING FOCAL PLANE DETECTOR

(75) Inventor: Tej Paul Kaushal, Malvern (GB)

(73) Assignee: Qinetiq Limited, Farnborough (GB)

( * ) Notice: Subject to any disclaimer, the term of this patent is extended or adjusted under 35 U.S.C. 154(b) by 213 days.

(21) Appl. No.: 10/503,311

(22) PCT Filed: Jan. 31, 2003

(86) PCT No.: PCT/GB03/00412

§ 371 (c)(1),
(2), (4) Date: Aug. 2, 2004

(87) PCT Pub. No.: WO03/067206

PCT Pub. Date: Aug. 14, 2003

(65) Prior Publication Data

US 2005/0224732 A1    Oct. 13, 2005

(30) Foreign Application Priority Data

Feb. 2, 2002    (GB) ................................. 0202464.4

(51) Int. Cl.
*G01N 21/86* (2006.01)
(52) U.S. Cl. ................. 250/559.1; 250/208.1
(58) Field of Classification Search ............. 250/208.1, 250/214.1, 559.1, 239
See application file for complete search history.

(56) References Cited

U.S. PATENT DOCUMENTS

| | | | |
|---|---|---|---|
| 5,354,987 A | 10/1994 | MacPherson | |
| 5,420,421 A * | 5/1995 | Lindgren et al. | ........ 250/252.1 |
| 5,466,943 A | 11/1995 | Green et al. | |
| 6,097,029 A | 8/2000 | Downie et al. | |
| 2001/0040216 A1 | 11/2001 | Knauth et al. | |

FOREIGN PATENT DOCUMENTS

WO    01/95246 A    12/2001

OTHER PUBLICATIONS

Suffis et al; "Characterization of 128*192 Si:Ga Focal Plane Arrays: Study of Nonuniformity, Stability of its Correction, and Application for the Crystal Camera"; Infrared Detectors and Focal Plane Arrays V, Orlando, FL, Apr. 14-17, 1998, vol. 3379, pp. 235-248, XP009013092.

* cited by examiner

*Primary Examiner*—Que T. Le
(74) *Attorney, Agent, or Firm*—Nixon & Vanderhye P.C.

(57) ABSTRACT

A focal plane detector adapted to be calibrated using an image of part of the human body. Further, a method of calibrating a focal plane detector having a plurality of detector elements, comprising the steps of presenting a first and a second image to the focal plane detector array, measuring the output from each detector during each first and second image, analysing the outputs and compensating for errors in the output of each detector element such that the outputs from the detector elements are substantially equal when illuminated with electromagnetic radiation of a given intensity. The first and second images have substantially no discernible features therein, and one of the first and second images comprises an image of part of the human body. The apparatus and method are particularly applicable to focal plane detectors sensitive to infrared radiation.

20 Claims, 1 Drawing Sheet

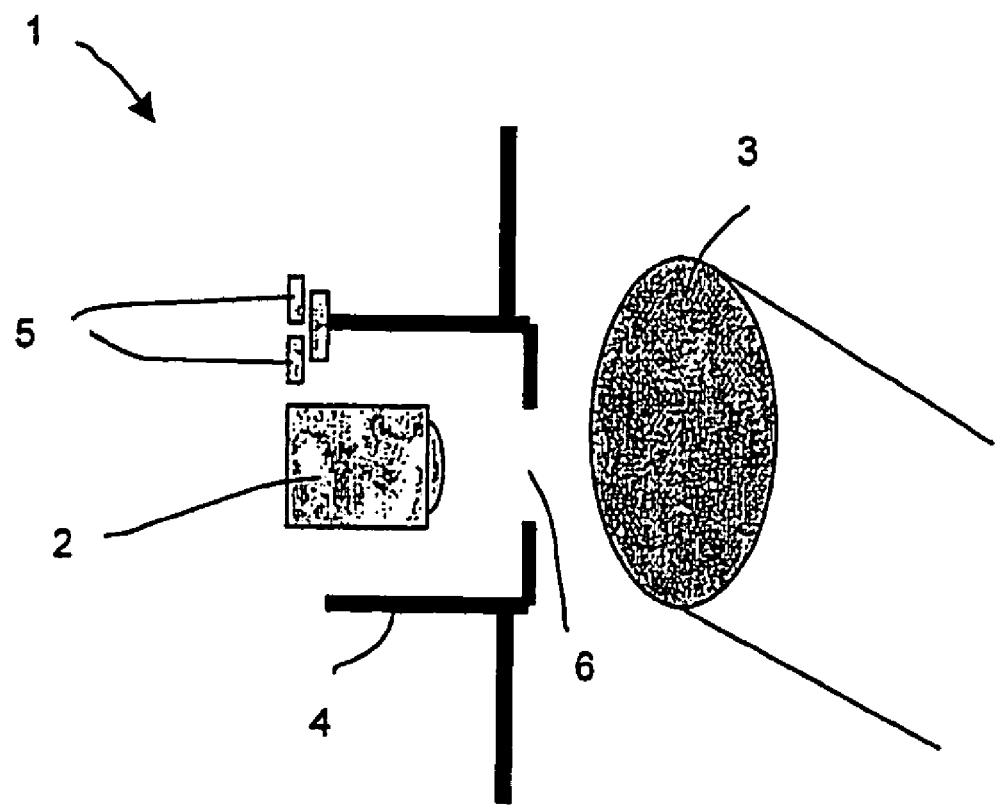
The Figure

HUMAN BODY STANDARD CALIBRATION APPARATUS AND METHOD FOR CALIBRATING FOCAL PLANE DETECTOR

This application is the US national phase of international application PCT/GB03/00412, filed 31 Jan. 2003, which designated the US and claims priority to GB Application No. 0202464.4 filed 2 Feb. 2002. The entire contents of these applications are incorporated herein by reference.

BACKGROUND OF THE INVENTION

1. Field of the Invention

The present invention relates to an apparatus and method for calibrating focal plane arrays. The invention has particular relevance to infrared focal plane detectors.

2. Discussion of Prior Art

Conventional focal plane detectors typically comprise an array of optoelectronic sensor elements arranged to detect electromagnetic radiation incident on the sensors within the array. Generally, the optoelectronic sensors provide an output (for example a voltage, a current, a resistance, a capacitance or a charge) which varies as a function of the intensity of the electromagnetic radiation incident on the sensors. When used in conjunction with focusing means, for example a lens, the sensor outputs from such a focal plane array may be used to reconstruct an image of objects within a scene. The output from each sensor element within the array generally corresponds to a picture element (pixel) within such an image.

Sensor elements within a focal plane array are not identical, and as a result individual sensors within the focal plane array exhibit different responsivities to electromagnetic radiation incident on the array. The variations in responsivity between individual sensor elements generate undesirable noise (generally known as fixed pattern noise) in the output from the array which has to be calibrated out.

Any DC offset in the output from the sensor elements can be corrected for by presenting a bland defocused image to the focal plane array and mapping the response of each sensor element in the array. The slope of the response (linearity) of the sensor elements may also be measured by changing the intensity of the electromagnetic radiation incident on the array and re-measuring the response of each sensor element in the array. This is achievable by using a second bland defocused image, the second image being arranged to illuminate the array with a different intensity of electromagnetic radiation to the first image.

With this information, a focal plane detector array can be fully calibrated, and a clean image produced.

However, as the array ages, and as the intensity of electromagnetic radiation incident on the array varies (as a function of operating environment and with different scenes), it is possible that the array will need to be re-calibrated periodically.

Variable optics may be used to re-calibrate the array using the foregoing method of presenting bland defocused images to the array and characterising the response therefrom. However, variable optics increase the complexity and hence the cost of the focal plane detector.

Furthermore, this method is not optimised for re-calibrating infrared focal plane detectors (for example thermal imagers) due to a lack of bland defocused images having different temperatures. The accuracy of any adjustments to the linearity of the array will be dependent on the temperature separation of the first and second bland defocused images. Accordingly, a variable infrared source may be required as part of the re-calibration process.

Periodic re-calibration using flags or shutters placed into the optical path of the array are known. For example, in amorphous silicon cameras re-calibration occurs approximately once every minute or so (such devices are not very linear). These cameras insert a flag into the optical path to allow measurement of pixel variations and make a correction on that basis.

However, such devices increase the complexity and hence the cost of the focal plane detector. Furthermore, the shutter obscures the image from the scene during the re-calibration operation and this may be a nuisance if the re-calibration occurs automatically.

It is an object of the present invention to mitigate at least some of the disadvantages of the prior art. It is a further object of the present invention to provide an apparatus and method for re-calibrating periodically a focal plane array.

SUMMARY OF THE INVENTION

According to a first aspect of the present invention there is now proposed a focal plane detector adapted to be calibrated using an image of part of the human body, the focal plane detector having a field of view, a focal range and a depth of field configured to focus an image of objects in a scene within said field of view, focal range and depth of field onto a plurality of detector elements, the focal plane detector further comprising, a housing having an imaging aperture arranged to convey an image of a scene to the detector elements, and manually operable switching means for activating the calibration of the focal plane detector, wherein, the manually operable switching means and the imaging aperture are arranged with respect to one another so as to ensure that, during manual operation of the switching means, the part of the human body is located so as to substantially fill the field of view of the focal plane detector and positioned outside the focal range and depth of field thereof, such that the image of the scene presented to the detector elements comprises an image of part of the human body having substantially no features therein discernible by said detector elements.

This configuration provides the advantage that no additional calibration equipment is required to calibrate the focal plane detector. The configuration obviates the requirement for a variable source of electromagnetic radiation or flags and shutters inserted into the optical path of the focal plane detector.

The manually operable switching means enables the calibration to be initiated on demand, for example when the performance of the focal plane detector falls below an acceptable level.

In a preferred embodiment, the housing is in physical communication with the switching means such that the switching means are manually operable via the housing.

In another preferred embodiment, the housing comprises a projection therefrom, in which the imaging aperture is disposed, such that the switching means are manually operable via the projection on the housing.

This configuration is advantageous in that the same part of the body is used to initiate the calibration process and provide the image for the calibration process, thereby facilitating the calibration of the focal plane detector. Further, the co-location of these features ensures that the part of the body used to provide the image is in the optimum position when the calibration is initiated. An image having substantially no discernible features therein (i.e. a bland, defocused image) is ensured.

Preferably, the part of the human body comprises a hand and the switching means are adapted to be operated by a human hand.

Preferably, the part of the human body comprises a digit and the switching means are adapted to be operated by a human digit.

Conveniently, the part of the human body comprises a finger and the switching means are adapted to be operated by a human finger.

Ergonomically, it is advantageous to use a finger to operate the switching means and provide the calibration image.

Preferably, the detector elements are adapted to detect infrared radiation.

Even more preferably, the detector elements are adapted to detect radiation having a wavelength in the range 3 µm–14 µm. The detector elements may comprise bolometers.

This configuration of the apparatus is particularly advantageous in that a variable infrared source is obviated. Providing a temperature bland image of part of the human body enables the focal plane detector to be calibrated with electromagnetic radiation from a known scene temperature (around 35° C.). The focal plane detector may also be calibrated using a temperature bland image comprising an image of an ambient background (around 20° C.).

The requirement for a variable infrared (thermal) source is circumvented by using readily available scenes having different temperatures. For indoor applications, suitable temperature bland scenes would be (a) room temperature (around 20° C.) and (b) human skin temperature (around 35° C.).

The selection of the above scenes for the re-calibration process enables the linearity of the array to be determined over a wide temperature range (including a large proportion of the operating temperature range of the focal plane array) and does not require a dedicated infrared (thermal) source According to a second aspect of the present invention, there is now proposed a camera having a focal plane detector according to the first aspect of the present invention.

According to a third aspect of the present invention, a method of calibrating a focal plane detector having a plurality of detector elements, comprises the steps of (i) presenting a first image to the focal plane detector and measuring a first output from each detector element in the array, (ii) analysing the first outputs and compensating for errors in the output of each detector element such that the outputs from the detector elements are substantially equal, wherein the first image comprises an image of part of the human body, the first image having substantially no discernible features therein.

This method enables DC offsets within the focal plane detector to be corrected. The method provides the advantage that no additional calibration equipment is required to calibrate the focal plane detector. The configuration obviates the requirement for a variable source of electromagnetic radiation or flags and shutters inserted into the optical path of the focal plane detector.

According to a fourth aspect of the present invention, a method of calibrating a focal plane detector having a plurality of detector elements, comprises the steps of (i) presenting a first image to the focal plane detector and measuring a first output from each detector element in the array, (ii) presenting a second image to the focal plane detector and measuring a second output from each detector element in the array, (iii) analysing the first and second outputs and compensating for errors in the output of each detector element such that the outputs from the detector elements are substantially equal when illuminated with electromagnetic radiation of a given intensity, wherein the first and second images have substantially no discernible features therein, and wherein one of the first and second images comprises an image of part of the human body.

The provision of a second image enables linearity errors within the focal plane detector to be corrected. The method provides the advantage that no additional calibration equipment is required to calibrate the focal plane detector. The configuration obviates the requirement for a variable source of electromagnetic radiation or flags and shutters inserted into the optical path of the focal plane detector.

For clarity, the method according to the fourth aspect of the present invention has been described in terms of presenting a first and a second image to the focal plane detector. However, the sequence in which the images are presented to the focal plane array does not affect the calibration process.

In a preferred embodiment, the part the human body comprises a hand.

In another preferred embodiment, the part the human body comprises a digit.

In a further preferred embodiment, the part the human body comprises a finger.

Ergonomically, it is advantageous to use a finger to operate the switching means and provide the calibration image.

Preferably, the method of calibrating a focal plane detector further comprises the step of initiating the calibration process using the same part of the human body. The step of initiating the calibration process may comprise activating switching means.

This is advantageous in that the same part of the body is used to initiate the calibration process and provide the image for the calibration process, thereby facilitating the calibration of the focal plane detector. Further, the switching means and the field of view of the focal plan detector may be co-located, such configuration ensuring that the part of the body used to provide the image is in the optimum position when the calibration is initiated. An image having substantially no discernible features therein (i.e. a bland, defocused image) is ensured.

Preferably, the detector elements are adapted to detect infrared radiation. Even more preferably, the detector elements are adapted to detect radiation having a wavelength in the range 3 µm–14 µm. The detector elements may comprise bolometers.

This method is particularly advantageous in that a variable infrared source is obviated. Providing a temperature bland image of part of the human body enables the focal plane detector to be calibrated with electromagnetic radiation from a known scene temperature (around 35° C.). The focal plane detector may also be calibrated using a temperature bland image comprising an image of an ambient background (around 20° C.).

The requirement for a variable infrared (thermal) source is circumvented by using readily available scenes having different temperatures. For indoor applications, suitable temperature bland scenes would be (a) room temperature (around 20° C.) and (b) human skin temperature (around 35° C.).

The selection of the above scenes for the re-calibration process enables the linearity of the array to be determined over a wide temperature range (including a large proportion of the operating temperature range of the focal plane array) and does not require a dedicated infrared (thermal) source.

BRIEF DESCRIPTION OF THE DRAWINGS

The invention will now be described, by example only, with reference to the accompanying drawings in which;

The FIGURE is a schematic representation of a focal plane detector according to the present invention.

Focal plane array detectors require periodic re-calibration in order to correct for variations in responsivity between individual sensor elements within the array. The inter-element variations comprise a DC offset and a component which may vary as a function of the intensity of electromagnetic radiation incident on the array. The latter gives rise to linearity errors within the focal plane detector.

Variations in responsivity between individual sensor elements may be inherent to the particular array technology or may be caused by changes in the focal plane array, for example due to ageing.

Re-calibration using flags or shutters placed into the optical path of the array is known. For example, in amorphous silicon cameras, re-calibration occurs approximately once every minute or so (such devices are not very linear). These cameras insert a flag into the optical path of the array to allow measurements to be made of sensor variations. Corrections are made on the basis of these measurements.

An alternative technique for re-calibrating the array comprises presenting a bland defocused image to the camera and mapping the response of each sensor element in the array. Corrections for the DC offset can subsequently be made. The slope of the response (linearity) of the sensor elements may also be measured by changing the intensity of the electromagnetic radiation incident on the array and re-measuring the response of each sensor element in the array. This is achievable by using a second bland defocused image, the second image being arranged to illuminate the array with a different intensity of electromagnetic radiation to the first image.

Similarly, an infrared focal plane detector, for example a thermal imager, may be recalibrated by presenting a first temperature bland scene to the focal plane detector. Any DC offset can therefore be corrected for by mapping the response of each sensor If this is repeated using a second temperature bland scene at a different temperature, then the slope of the response (linearity) can be measured too. A variable infrared (thermal) source may be required as part of the re-calibration process to provide the bland scenes at different temperatures.

Referring to the figure, according to the present invention the requirement for a variable infrared (thermal) source is circumvented by using readily available scenes having different temperatures. For indoor applications, suitable temperature bland scenes would be (a) room temperature (around 20° C.) and (b) human skin temperature (around 35° C.).

The selection of the above scenes for the re-calibration process enables the linearity of the array to be determined over a wide temperature range (including a large proportion of the operating temperature range of the focal plane array) and does not require a dedicated infrared (thermal) source.

In the configuration shown schematically in the figure, one of the temperature bland scenes comprises part of the human body (3), for example a hand or a finger.

In the figure, the re-calibration of the focal plane detector comprises presenting a human finger (3) in the field of view of the focal plane array (2). The finger (3) is positioned such that it fills the field of view, thereby creating a temperature bland scene. In practice, the focal range of the detector (2) exhibits a certain depth of field and a defocused image is achieved by placing the finger (3) in close proximity to the focal plane detector (2). Accordingly, no active focusing or de-focusing of the optics of the detector (3) is required during re-calibration.

The re-calibration process may be initiated automatically or may be controlled manually, for example by activating a switch (5). The focal plane detector may be configured to indicate when re-calibration is required (for example when the fixed pattern noise reaches a certain level), for example by flashing an LED.

Referring to the figure, re-calibration is achieved by the human finger (3) depressing a button (4). In this particular configuration the button (4) provides the aperture (6) through which the focal plane detector (2) views the scene. Alternatively, the button (4) is arranged in close proximity to the aperture (6) through which the focal plane detector (2) views the scene, such that the finger (3) substantially fills the field of view of the focal plane detector (2). Depressing the button (4) closes a pair of switch contacts (5) connected to the focal plane detector (2) thereby initiating a re-calibration. The method guarantees that the object presented is bland, out of focus, and at skin temperature.

The method of re-calibrating the focal plane detector array (2) according to the present invention facilitates re-calibration of the focal plane detector (2) on demand and is inexpensive to implement.

The method is particularly applicable to handheld instruments using thermal focal plane detectors and for occasionally maintained installations. The method and apparatus (1) of the present invention are particularly applicable to bolometer focal plane detectors.

The invention claimed is:

1. A focal plane detector adapted to be calibrated using an image of a part of the human body, the focal plane detector having a field of view, a focal range and a depth of field configured to focus an image of objects in a scene within said field of view, focal range and depth of field onto a plurality of detector elements, the focal plane detector further comprising:
   a housing having an imaging aperture arranged to convey an image of a scene to the detector elements; and
   a manually operable switch for activating the calibration of the focal plane detector, wherein, the manually operable switch and the imaging aperture are arranged with respect to one another so as to ensure that, during manual operation of the switch, the part of the human body is located so as to substantially fill the field of view of the focal plane detector and positioned outside the focal range and depth of field thereof, such that the image of the scene presented to the detector elements comprises an image of part of the human body having substantially no features therein discernible by said detector elements.

2. A focal plane detector according to claim 1 wherein the housing is in physical communication with the switch such that the switch is manually operable via the housing.

3. A focal plane detector according to claim 2 wherein the housing comprises a projection therefrom, in which the imaging aperture is disposed, such that the switch is manually operable via the projection on the housing.

4. A focal plane detector according to claim 1 wherein the part of the human body comprises a hand and wherein the switch is adapted to be operated by a human hand.

5. A focal plane detector according to claim 1 wherein the part of the human body comprises a digit and wherein the switch is adapted to be operated by a human digit.

6. A focal plane detector according to claim 5 wherein the part of the human body comprises a finger and wherein the switch is adapted to be operated by a human finger.

7. A focal plane detector according to claim 1 wherein the detector elements are adapted to detect infrared radiation.

8. A focal plane detector according to claim 7 wherein the detector elements are adapted to detect radiation having a wavelength in the range 3 µm–14 µm.

9. A focal plane detector according to claim 7 wherein the detector elements comprise bolometers.

10. A camera having a focal plane detector according to claim 1.

11. A method of calibrating a focal plane detector having a plurality of detector elements, comprising the steps of
   presenting a first image to the focal plane detector and measuring a first output from each detector element in the array,
   analysing the first outputs and compensating for errors in the output of each detector element such that the outputs from the detector elements are substantially equal,
   wherein the first image comprises an image of part of the human body, the first image having substantially no features therein discernible by said detector elements.

12. A method of calibrating a focal plane detector having a plurality of detector elements, comprising the steps of
   presenting a first image to the focal plane detector and measuring a first output from each detector element in the array,
   presenting a second image to the focal plane detector and measuring a second output from each detector element in the array,
   analysing the first and second outputs and compensating for errors in the output of each detector element such that the outputs from the detector elements are substantially equal when illuminated with electromagnetic radiation of a given intensity,
   wherein the first and second images have substantially no features therein discernible by said detector elements, and wherein one of the first and second images comprises an image of part of the human body.

13. A method according to claim 11 wherein the part of the human body comprises a hand.

14. A method according to claim 11 wherein the part of the human body comprises a digit.

15. A method according to claim 14 wherein the part of the human body comprises a finger.

16. A method according to claim 11 and further comprising the step of initiating the calibration process using the part of the human body.

17. A method according to claim 16 wherein the step of initiating the calibration process comprises activating a switch.

18. A method according to claim 11 wherein the detector elements are adapted to detect infrared radiation.

19. A method according to claim 18 wherein the detector elements are adapted to detect radiation having a wavelength in the range 3 µm–14 µm.

20. A method according to claim 18 wherein the detector elements comprise bolometers.

* * * * *